(12) United States Patent
Miller et al.

(10) Patent No.: US 11,834,082 B2
(45) Date of Patent: Dec. 5, 2023

(54) RAIL BUCKLE DETECTION AND RISK PREDICTION

(71) Applicant: Progress Rail Services Corporation, Albertville, AL (US)

(72) Inventors: Marc Miller, Lee's Summit, MO (US); Chad A. Moore, Kyle, TX (US); Lawrence A. Mianzo, Pittsburgh, PA (US); Mike Hoffelder, Norwich, NY (US); Darrell Cantrell, Shawnee, KS (US); Derrill J. Koelz, Pittsburgh, PA (US); Narayana G. Nadukuru, Sewickley, PA (US)

(73) Assignee: Progress Rail Services Corporation, Albertville, AL (US)

( * ) Notice: Subject to any disclaimer, the term of this patent is extended or adjusted under 35 U.S.C. 154(b) by 627 days.

(21) Appl. No.: 16/574,446

(22) Filed: Sep. 18, 2019

(65) Prior Publication Data
US 2021/0078622 A1  Mar. 18, 2021

(51) Int. Cl.
*B61L 23/04* (2006.01)
*B61K 9/08* (2006.01)
(Continued)

(52) U.S. Cl.
CPC .............. *B61L 23/044* (2013.01); *B61K 9/08* (2013.01); *B61L 23/047* (2013.01);
(Continued)

(58) Field of Classification Search
CPC ............. B61L 15/0072; B61L 15/0081; B61L 23/042; B61L 23/044; B61L 23/047; B61K 9/08; G01N 19/08
See application file for complete search history.

(56) References Cited

U.S. PATENT DOCUMENTS

| 6,356,299 B1 | 3/2002 | Trosino et al. |
| 7,152,347 B2 | 12/2006 | Herzog et al. |

(Continued)

FOREIGN PATENT DOCUMENTS

| CN | 104129404 B | 6/2011 |
| CN | 108146465 A | 6/2018 |

(Continued)

OTHER PUBLICATIONS

UK Examination Report for Int'l. Patent Appln. No. 2205289.8, dated Mar. 22, 2023 (5 pgs).

*Primary Examiner* — Michael J Dalbo

(57) ABSTRACT

A system and method for detecting buckled rail and for predicting a risk for rail buckling is disclosed. The method may comprise receiving data from a camera mounted on locomotive traveling on the railroad track. The data may include images of the buckled rail and dimensions of the buckled rail when the camera detects the buckled rail. The data may further include images of the ballast and condition of the ballast. The method may further comprise receiving data from a thermal camera mounted to the locomotive indicating the temperature of the rails. The method may further comprise transmitting an alarm signal to a display interface of a remote unit if the dimensions of the buckled rail meet a predetermined threshold, and predicting a risk for rail buckling based at least on the temperature of the rails and the condition of the ballast.

20 Claims, 9 Drawing Sheets

(51) Int. Cl.
*G06Q 10/0635* (2023.01)
*G01N 19/08* (2006.01)
*B61L 27/53* (2022.01)

(52) U.S. Cl.
CPC ......... *G06Q 10/0635* (2013.01); *B61L 27/53* (2022.01); *G01N 19/08* (2013.01); *G06T 2207/10048* (2013.01)

(56) References Cited

U.S. PATENT DOCUMENTS

| | | | |
|---|---|---|---|
| 7,999,848 B2 | 8/2011 | Chew | |
| 8,942,426 B2 | 1/2015 | Bar-Am | |
| 9,487,222 B2 | 11/2016 | Palmer et al. | |
| 10,081,376 B2 | 9/2018 | Singh | |
| 2007/0044566 A1* | 3/2007 | Harrison | B61L 23/047 73/760 |
| 2007/0217670 A1* | 9/2007 | Bar-Am | B61L 23/047 382/141 |
| 2007/0291130 A1* | 12/2007 | Broggi | G01S 17/931 348/E13.015 |
| 2009/0051788 A1* | 2/2009 | Kamada | H04N 5/232 348/231.99 |
| 2010/0217462 A1* | 8/2010 | Shaffer | B61L 15/0072 701/19 |
| 2011/0004446 A1* | 1/2011 | Dorn | H04L 43/0817 709/217 |
| 2012/0245908 A1 | 9/2012 | Berggren | |
| 2012/0269382 A1* | 10/2012 | Kiyohara | G06V 20/588 382/103 |
| 2014/0142868 A1* | 5/2014 | Bidaud | G01N 21/8803 702/34 |
| 2014/0277824 A1* | 9/2014 | Kernwein | B61L 23/044 701/1 |
| 2015/0268172 A1* | 9/2015 | Naithani | B61L 23/048 348/129 |
| 2017/0227470 A1* | 8/2017 | Cesarano | G01S 7/006 |
| 2019/0039633 A1* | 2/2019 | Li | B61L 23/045 |
| 2019/0161104 A1* | 5/2019 | Betis | B61L 25/025 |
| 2019/0364387 A1* | 11/2019 | Mian | H04W 4/029 |
| 2020/0158656 A1* | 5/2020 | Chung | B61L 27/70 |
| 2020/0239049 A1* | 7/2020 | Dick | B61K 9/10 |
| 2020/0302592 A1* | 9/2020 | Ebersohn | G06T 11/60 |

FOREIGN PATENT DOCUMENTS

| | | |
|---|---|---|
| CN | 112722009 A | 4/2021 |
| GB | 2305796 A | 4/1997 |
| GB | 2372315 A | 8/2002 |
| JP | 10325703 A * | 12/1998 |
| KR | 20090129714 A | 12/2009 |
| KR | 20090131905 A | 12/2009 |

* cited by examiner

RAIL BUCKLE DETECTION AND RISK PREDICTION

TECHNICAL FIELD

The present disclosure generally relates to rail buckling in railroad tracks and, more specifically, to systems and methods for detecting rail buckling and for predicting the risk of rail buckling on both the track occupied by the locomotive and any track adjacent to the locomotive in any direction.

BACKGROUND

A railroad track on a train railway consists of rails, ties or sleepers laid perpendicular to the rails and connected to the rails by fasteners, and ballast or rocks that form a bed for the railroad track. The ties hold the rails upright and keep them spaced apart, and transfer loads from the rails to the ballast. The ballast serves to restrain the ties from horizontal movement due to stress in the rails. Continuous welded rail is a typo of rail with few joints that is welded solid for over a long distance, such as one or two miles. Continuous welded rail may be subjected to tensile stress and fracturing in cold conditions as the metal tries to contract, and to compressive stress and buckling in hot conditions as the metal tries to expand. Buckled rail (also referred to as "sun kinks") may result from a combination of factors including: 1) excessive tensile and compressive stress in the rail which may be measured by increased rail temperatures above neutral rail temperature (NRT), and 2) poor ballast conditions. When the ballast conditions are poor, such as due to the presence of mud or dirt, the ballast is weakened and less able to restrain the ties from horizontal, vertical, and lateral movement caused by stress in the rails. When the rails are above the NRT, the rails may buckle at the location of the weakened ballast where the ties are freer to move and accommodate buckling.

As buckled rail may lead to train derailments, it is important to monitor railroad tracks for rail buckling so that railroad personnel can timely respond by halting or slowing trains through the area, and/or by sending maintenance crew to repair the tracks. However, rail buckling may be temporary depending on fluctuating temperatures. For example, buckling may occur during the day due to excessive heat, and recede in evening hours as ambient temperatures fall. Due to the temporary nature of rail buckling, it may be challenging to detect buckling over hundreds of miles of tracks and to alert railroad personnel in a timely manner.

U.S. Pat. No. 8,942,426 discloses an automatic inspection system for monitoring railroad track for hazardous conditions. The automatic inspection system includes an imaging module on a passenger or freight train to capture video images of the railroad track under the train as the train is in motion. The captured video images are automatically processed using algorithms to determine if an irregularity is present on the railroad track, and the video images containing the irregularities are transmitted to a control center. In addition, U.S. Patent Application Publication Number 2019/0039633 discloses a system for detecting and reporting railroad track anomalies. The system includes a track inspection application that receives images of the railroad track captured by cameras mounted on a train, compares the captured images with reference images from the same location and vantage points, and detects anomalies in the railroad track by differences between the captured images and corresponding reference images.

Although such techniques are effective in identifying safety hazards on railroad tracks, there remains a need for improved strategies for detecting buckled rail and for sending alarms to railroad company personnel when buckled rail is detected. Furthermore, there is also a need for strategies for predicting the likelihood for rail buckling at certain areas of the railroad track, and for notifying railroad company personnel when the risk for rail buckling is significant.

SUMMARY

In accordance with one aspect of the present disclosure, a system for detecting buckled rail in a railroad track is disclosed. The system may comprise a forward-facing camera mounted on a locomotive of a train traveling on the railroad track. The forward-facing camera may be configured to capture images of the rails ahead of the locomotive, to detect buckled rail in the images, and to measure dimensions of the buckled rail. The system may further comprise an event recorder onboard the locomotive and in communication with the forward-facing camera. The event recorder may be configured to receive data from the forward-facing camera associated with the buckled rail when the forward-facing camera detects the buckled rail. The data may include images of the buckled rail and the dimensions of the buckled rail. The event recorder may be further configured to transmit an alarm signal to a display interface of a remote unit if the dimensions of the buckled rail meet a predetermined threshold.

In accordance with anther aspect of the present disclosure, a system for predicting a risk for rail buckling in a railroad track is disclosed. The railroad track may include rails connected by ties and supported on ballast. The system may comprise a forward-facing camera mounted on a locomotive of a train traveling on the railroad track. The forward-facing camera may be configured to capture images of the railroad track ahead of the locomotive, and to assess the condition of the ballast. The system may further comprise a thermal camera mounted to the locomotive and configured to measure a temperature of the rails, and an event recorder onboard the locomotive and in communication with the forward-facing camera and the thermal camera. The event recorder may be configured to receive data from the forward-facing camera and the thermal camera. The data may include the temperature of the rails from the thermal camera, and the images and the condition of the ballast from the forward-facing camera. The event recorder may be further configured to predict a risk for rail buckling at a section of the rails at least based on the temperature of the rails and the condition of the ballast at the section of the rails.

In accordance with another aspect of the present disclosure, a method for detecting buckled rail and for predicting a risk for rail buckling in a railroad track is disclosed. The railroad track may include rails connected by ties and supported on ballast. The method may comprise receiving data from a forward-facing camera mounted on a locomotive traveling on the railroad track. The data may include one or more images of the buckled rail and dimensions of the buckled rail when the forward-facing camera detects the buckled rail. The data may further include one or more images of the ballast and condition of the ballast. The method may further comprise receiving data from a thermal camera mounted to the locomotive. The data received from the thermal camera may include temperatures of the rails. The method may further comprise transmitting an alarm signal to a display interface of a remote unit if the dimensions of the buckled rail meet a predetermined threshold. In addition, the method may further comprise predicting a risk for rail buckling at a section of the rails based at least on the temperatures of the rails and the condition of the ballast at the section of the rails, and transmitting the predicted risk for rail buckling at the section of the rails to the display interface of the remote unit if the predicted risk is above a predetermined threshold.

These and other aspects and features of the present disclosure will be more readily understood when read in conjunction with the accompanying drawings.

DETAILED DESCRIPTION

Figure 1:
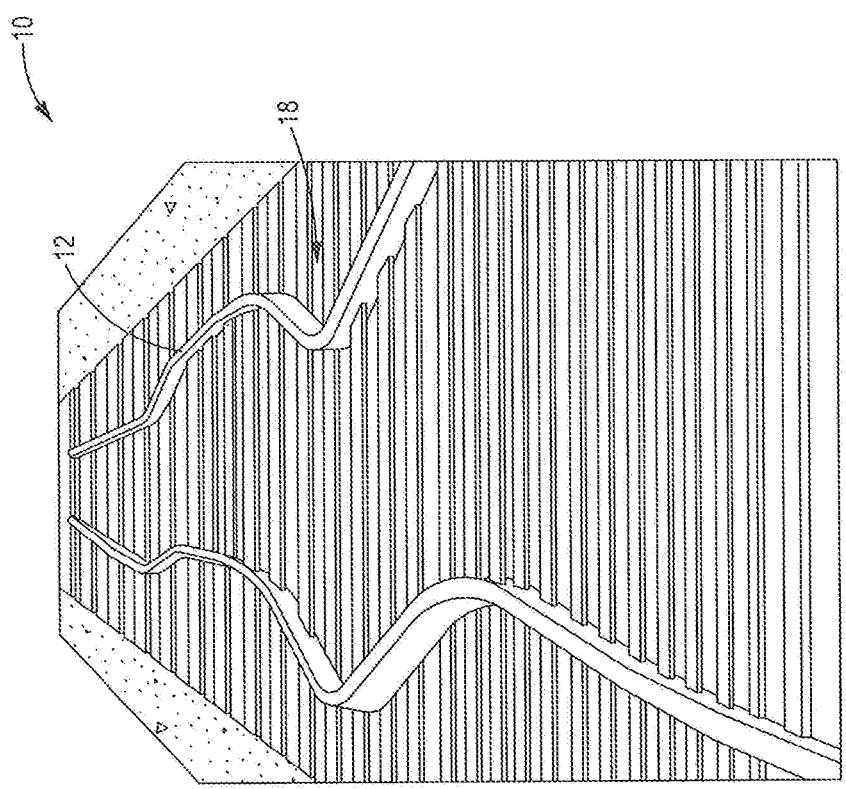
FIG. 1 is a perspective view of a railroad track, constructed in accordance with the present disclosure.
Figure 2:
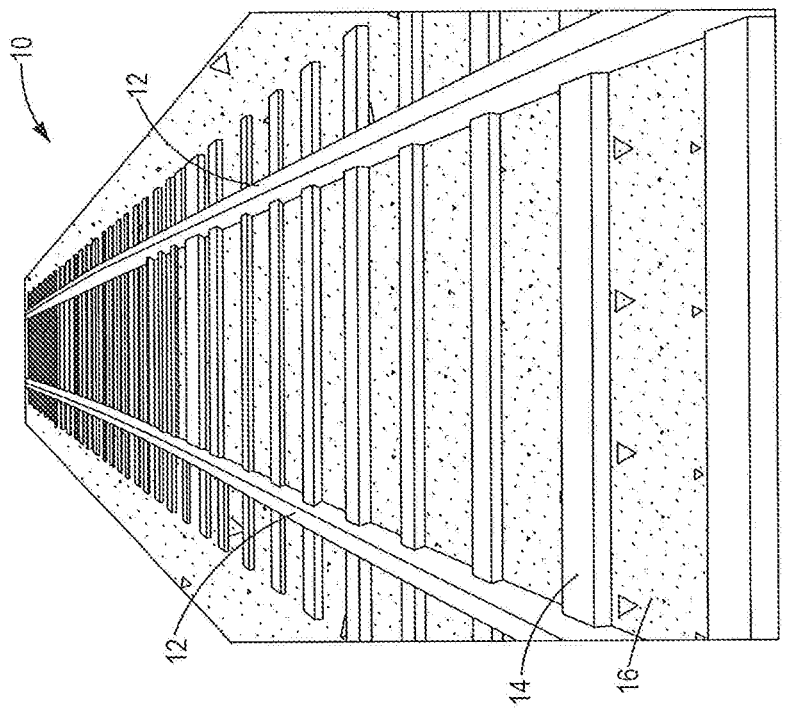
FIG. 2 is a perspective view of the railroad track with buckled rail, constructed in accordance with the present disclosure.

Referring now to the drawings, and with specific reference to FIG. 1, a railroad track 10 is shown. The railroad track 10 may include rails 12, ties 14 laid perpendicular to the rails 12 and connected to the rails 12 by fasteners, and ballast 16 for supporting the railroad track 10 and preventing movement of the ties 14. The rails 12 may be continuous welded rails that are welded together as a single piece over long distances, such as one or more miles or several kilometers. Alternatively, the rails 12 may be jointed track rails connected with joint bars, or other types of rails apparent to those skilled in the art. Under high temperature conditions, internal stress may develop in the rails 12 and the rails 12 may attempt to expand to relieve the stress. If the ballast conditions are poor, such as due to the presence of mud or dirt, the ballast 16 may not be strong enough to constrain horizontal movement of the ties 14 as the rails 12 attempt to expand. Consequently, buckled rail 18 may develop at locations of the rails 12 having high temperatures and weak or poor ballast conditions (see FIG. 2).

Figure 3:
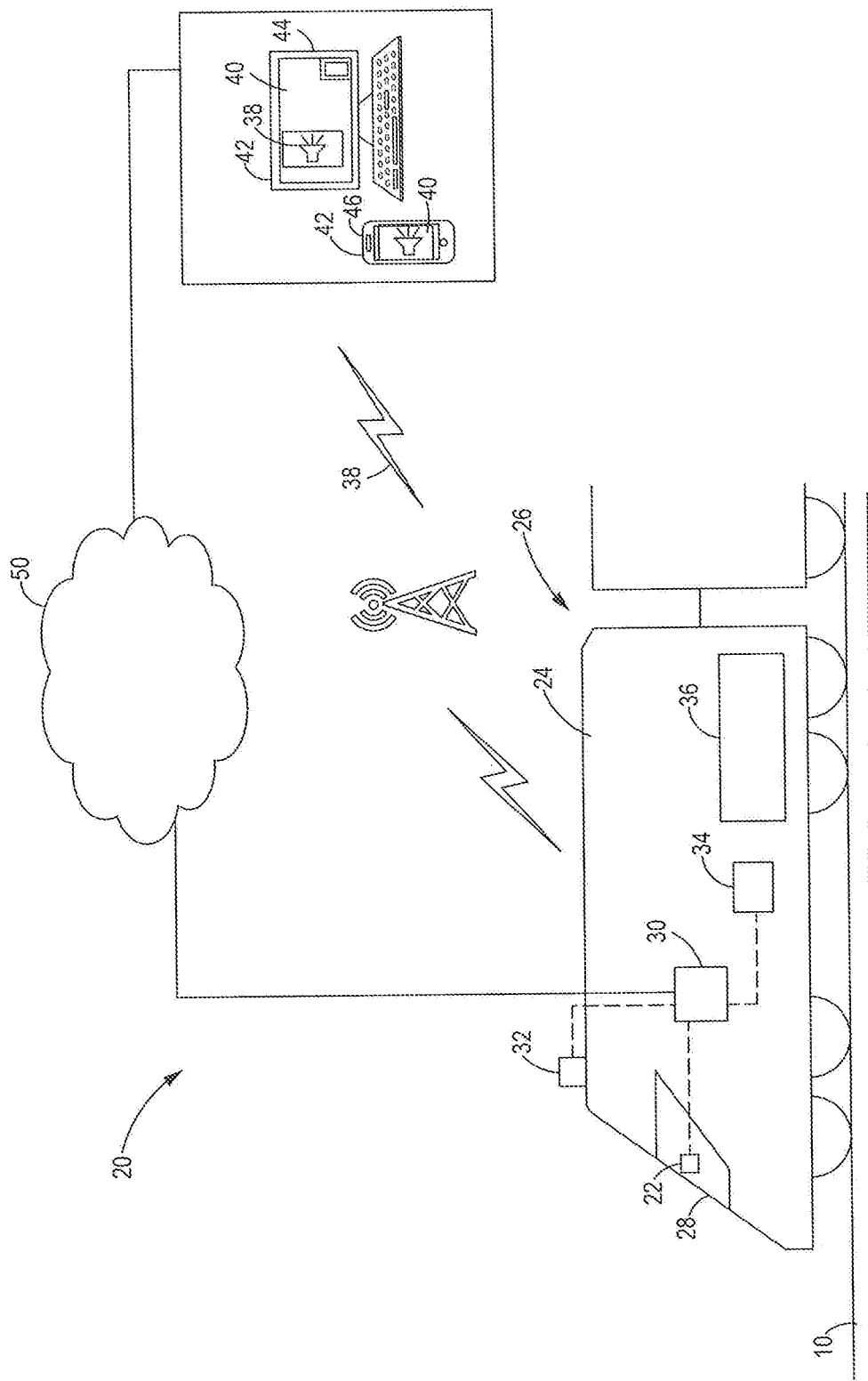
FIG. 3 is a schematic illustration of a system for detecting and alarming a rail buckling event, in accordance with the present disclosure.

Turning to FIG. 3, a system 20 for detecting and alarming a rail buckling event in the railroad track 10 is shown. The system 20 may include a forward-facing camera 22 mounted on a locomotive 24 of a train 26 configured to travel on the railroad track 10. In one arrangement, the forward-facing camera 22 may be mounted behind a windshield 28 of the locomotive 24 so that the camera 22 is protected from weather, insects, and debris. However, the camera 22 may be mounted at other forward-facing locations of the locomotive 24 as well. The system 20 may further include an event recorder 30 onboard the locomotive and in electrical or wireless communication with the camera 22. In operation, the camera 22 may capture images and videos of the rails 12 ahead of the locomotive 24. In addition, the camera 22 may apply processing functions to detect the presence of buckled rail 18 in the images and videos, and to measure the dimensions or the horizontal and vertical misalignment of the buckled rail 18. The event recorder 30 may receive data from the camera 22 when the camera 22 detects the buckled rail 18. The data may include one or more images of the buckled rail 18, one or more videos of the buckled rail 18, and the dimensions of the buckled rail 18.

Upon receipt of the data from the camera 22 indicating the rail buckling event, the event recorder 30 may collect additional data associated with the buckled rail 18 including, but not limited to, the geographical location of the buckled rail 18, the time that the buckled rail 18 was detected, the engine or train speed, the throttle position, as well as other data discussed more specifically below. In this regard, the event recorder 30 may be in communication with a global positioning system (GPS) 32 on the locomotive 24 to retrieve the location data, and an engine control module (ECM) 34 associated with an engine 36 of the locomotive 24 to retrieve the speed, throttle position, and any other relevant data. The event recorder 30 may geotag the images and/or the videos received from the camera 22 with latitude and longitude coordinates, and may timestamp the data received from the camera 22.

If the dimensions of the buckled rail 18 meet a predetermined threshold defined by a railroad company responsible for maintaining the tracks 10, then the event recorder 30 may transmit an alarm signal 38 to a display interface 40 of a remote unit 42 at a back office of the railroad company. In one arrangement, the alarm signal 38 may be transmitted over a cellular or wireless network, and the remote unit 42 may be a personal computer 44, a smartphone 46, or a tablet. The alarm signal 38 may be received as a signal at the display interface 40, or it may be received by email at the remote unit 42. In any event, the alarm signal 38 may provide an immediate, real time alert of the buckling event, allowing the railroad company personnel to timely respond such as by slowing or stopping trains in the area where the buckled rail 18 is detected, or by sending maintenance personnel to repair the tracks 10 before another train passes through the area.

Figure 4:
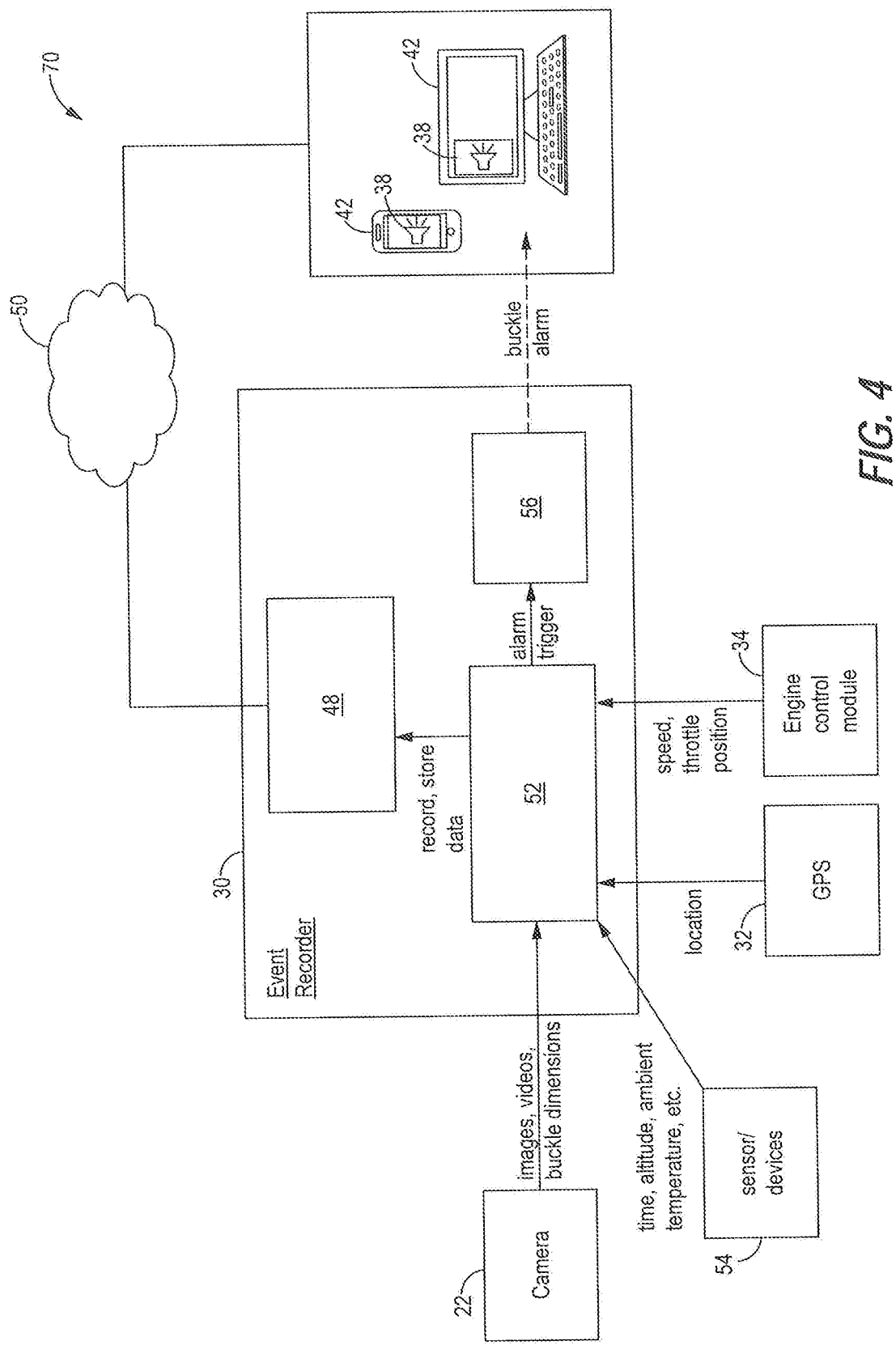
FIG. 4 is a schematic illustration of an exemplary strategy for detecting and alarming the rail buckling event with the system of FIG. 3, in accordance with the present disclosure.

In addition, the event recorder 30 may store all of the data associated with the rail buckling event locally in a memory 48 of the event recorder 30 (also see FIG. 4). The railroad personnel may access the data associated with the event and stored in the event recorder 30 via an internet cloud 50. Specifically, the railroad personnel may download the data from the cloud 50, analyze the data at the display interface 40 of the remote unit 42 to assess the severity of the rail buckling event, and determine how to respond based on the severity of the rail buckling event. In situations where there is no wireless or cellular coverage in the area where the buckled rail 18 is detected, the stored data in the event recorder 30 may also be available for download and review at a personnel computer or other device using playback analysis software. The latter feature may also enable railroad personnel or investigators to review and analyze the conditions surrounding a train derailment following the incident.

FIG. 4 shows an exemplary strategy for detecting and alarming the rail buckling event using the system of FIG. 3. The camera 22 may transmit data including one or more images, one or more videos, and the dimensions of the buckled rail 18 to a processing module 52 of the event recorder 30 when the buckled rail 18 is detected. Upon receipt of the data from the camera 22 indicating the rail buckling event, the processing module 52 may collect additional data associated with the rail buckling event from the UPS 32, the ECM 34, and other sensors or devices 54 of the locomotive 24. For example, the processing module 52 may receive the location of the buckled rail 18 from the GPS 32, the speed and throttle position of the train 26 at the location of the buckled rail 18 from the ECM 34, and other data such as, but not limited to, the time of the event, the altitude of the location, and the ambient temperature at the location from the various sensors or devices 54. The data associated with the rail buckling event may then be stored in the memory 48 of the event recorder 30. For example, the event recorder 30 may store an image snapshot of the buckled rail 18, a video snippet of the buckled rail 18, the dimensions of the buckled rail 18, the geographical location of the buckled rail 18, as well as the time, the ambient temperature, the engine or train speed, and the throttle position at the time and place where the buckled rail 18 was detected. Other relevant types of data associated with the rail buckling event may also be recorded and stored by the event recorder 30.

In addition, the processing module 52 may determine if the dimensions of the buckled rail 18 meet a predetermined threshold and, if so, may transmit an alarm trigger to a signaling module 56. In response to receipt of the alarm trigger, the signaling module 56 may transmit the alarm signal 38 to the remote unit 42 over a cellular or wireless network when available. The railroad personnel may access and download the data associated with the rail buckling event and stored in the event recorder 30 via the internet cloud 50.

Figure 5:
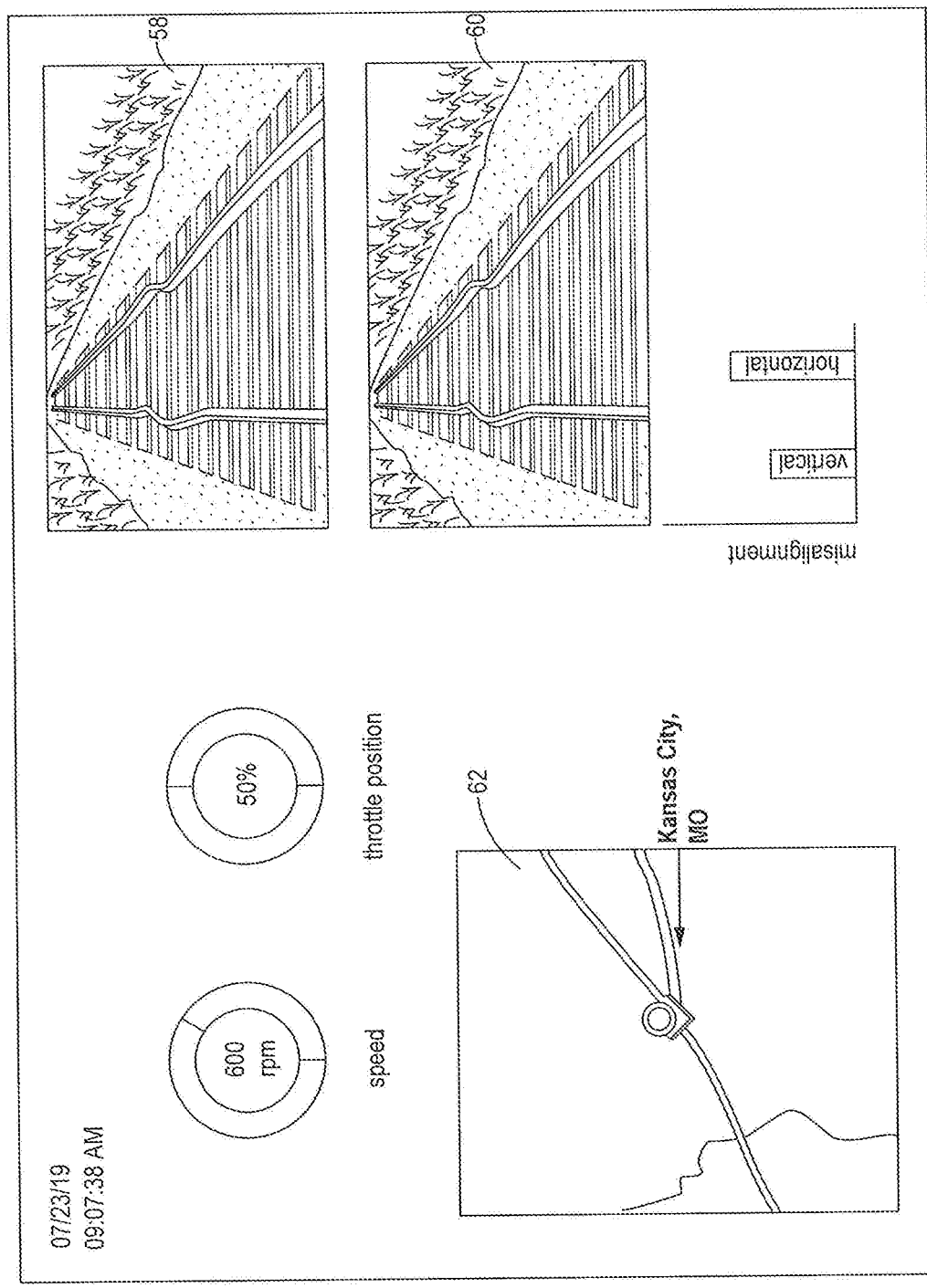
FIG. 5 is an exemplary display interface providing data, an image, and a video associated with the rail buckling event, in accordance with the present disclosure.

An exemplary display interface 40 providing the data associated with a rail buckling event is depicted in FIG. 5. The exemplary display interface 40 may be viewed at the remote unit 42 after downloading the data from the internet cloud 50, or at a personal computer or other device after downloading the data directly from the event recorder 30 using the playback analysis software. The display interface 40 may include one or more images 58 of the buckled rail 18, one or more videos 60 of the buckled rail 18, a map 62 showing the location of the buckled rail 18, the time and date when the buckled rail 18 was detected, the engine or train speed, the throttle position, and of the horizontal and vertical misalignment of the buckled rail 18. Other data associated with the rail buckling event (e.g., altitude, ambient temperature, etc.) may also be viewable at the display interface 40. It will be understood that the display interface 40 is merely exemplary and may include more or less data in practice. In addition, the data may be viewable in multiple display interfaces.

Figure 6:
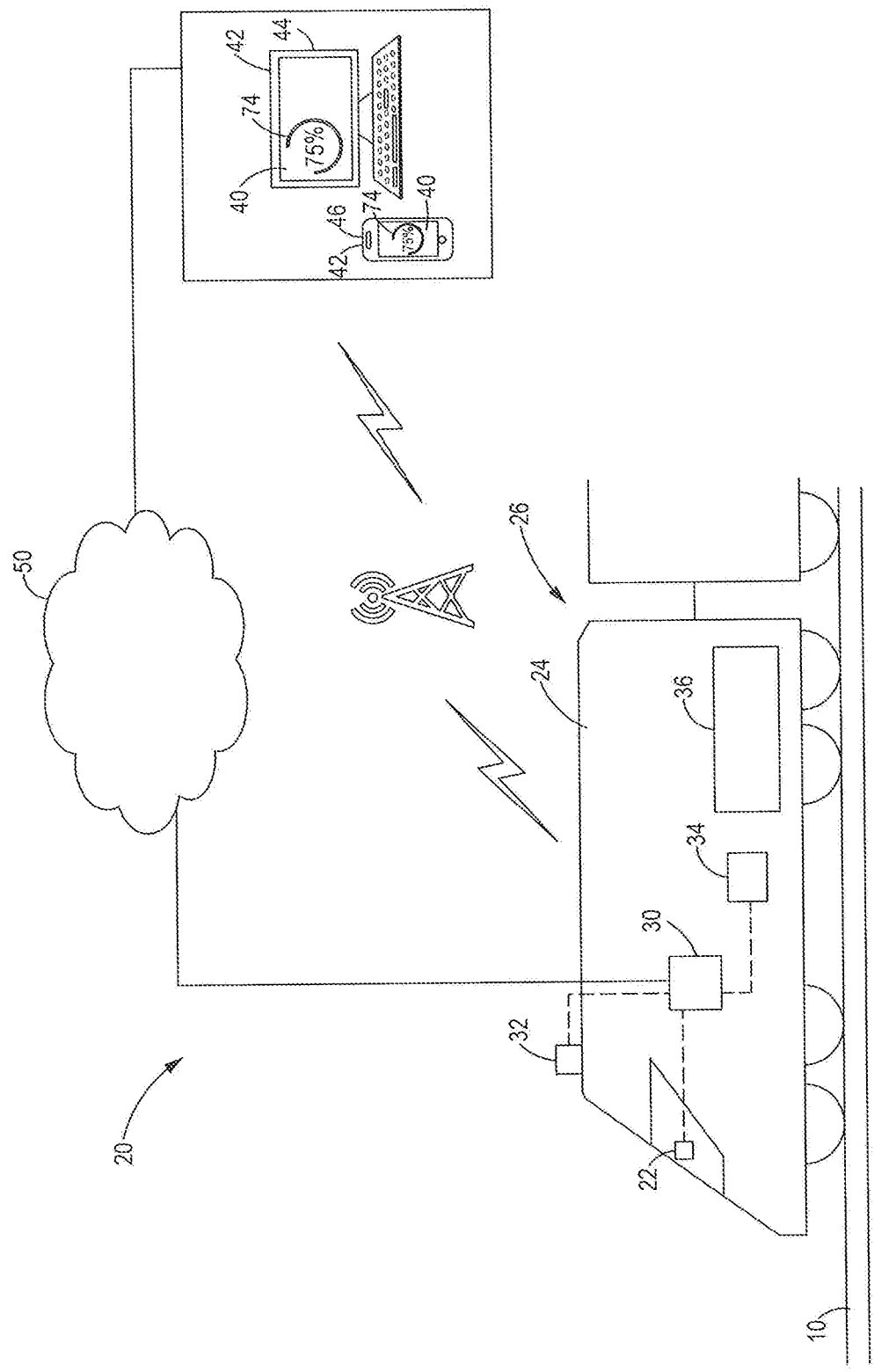
FIG. 6 is a schematic illustration of a system for predicting the risk of rail buckling, in accordance with the present disclosure.

Referring now to FIG. 6, a system 70 for predicting the risk of rail buckling is shown. The system 70 may operate in conjunction with the system 20 for detecting and alarming a rail buckling event described above. The system 70 may include one or more thermal cameras 72 mounted underneath the locomotive 24 that continuously measures the temperature of the rails 12. The frame rate of the thermal camera 72 may be adjusted according to the engine speed so that the thermal camera 72 is able to measure the temperature of the rails 12 in about 10 foot (or about 3 meter) increments regardless of the engine speed. The system 70 may further comprise the forward-facing camera 22 and the event recorder 30 as described above. The event recorder 30 may be in electrical or wireless communication with both the thermal camera 72 and the forward-facing camera 22.

The forward-facing camera 22 may capture images and videos of the railroad track 10 ahead of the locomotive 24, and apply processing functions or logic to assess the condition of the ballast 16. The event recorder 30 may receive data from the camera 22 including the images, the videos, and the ballast conditions as assessed by the camera 22. In addition, the event recorder 30 may continuously receive data from the thermal camera 72 indicating the temperature of the rails 12. Based at least on the ballast conditions and the temperature of the rails 12 at a defined section of the rails 12, the event recorder 30 may apply processing functions or logic to predict a risk for rail buckling at the section of the rails 12. Specifically, the event recorder 30 may determine that the section of rails 12 is at high risk for buckling if the temperature of the rails 12 is above a predetermined threshold, such as the neutral rail temperature (NRT), and the ballast conditions are poor. The camera 22 may determine that the ballast conditions are "poor" if a substantial amount of mud or dirt is present in the ballast 16.

In addition, the event recorder 30 may collect additional data associated with the section of the rails 12. Such additional data may include, but is not limited to, the geographical location of the section of the rails 12 at risk tor buckling, the time, altitude, and ambient temperature at the section of the rails 12, as well as the engine or train speed and the throttle position. As above, the geographical location may be determined based on signals received from the GPS 32 in communication with the event recorder 30, and the speed and the throttle position may be determined based on signals from the ECM 34 in communication with the event recorder 30.

Furthermore, the additional data collected by the event recorder 30 may also include dynamic braking data that indicates whether dynamic braking at the section of rails 12 has occurred or is common, as dynamic braking may input excessive energy into the rails 12 and contribute to the likelihood of rail buckling. This dynamic braking data may be obtained from the ECM 34 or another source. In addition, the event recorder 30 may collect historical buckling data from the memory 48 of the event recorder 30 that includes trends of recurring buckling at certain sections of the rails 12, and trends of rail buckling under certain conditions such as, but not limited to, rail temperature, seasonal ambient temperatures, locations, train speeds, and ballast conditions. The event recorder 30 may further perform historical trend analysis by applying basic logic to compare the collected data with the historical buckling data and determine the predicted risk for rail buckling at the section of the rails 12.

If the predicted risk for rail buckling is above a predetermined threshold, the event recorder 30 may transmit a predicted risk 74 for rail buckling to the remote unit 42 over a cellular or wireless network, if available. As explained above, the remote unit 42 may be a personal computer 44, a smartphone 46, or a tablet of personnel at a back office of the railroad company responsible for maintaining the tracks 10. The predicted risk may be received at the remote unit 42 as a signal at the display interface 40, or it may be received by email at the remote unit 42. If the predicted risk is high, railroad company personnel may respond by sending maintenance crew to clean or replace the ballast 16 and/or realign the tracks 10 before buckling occurs. Alternatively or in addition to this, railroad company personnel may respond by slowing trains or halting trains scheduled to pass over the section of rails 12 having a high risk for buckling until the rail temperatures and/or ambient temperatures fall.

The event recorder 30 may store all of the data associated with the section of the rails 12 at risk for buckling in the memory 48 of the event recorder 30. The stored data may include data such as the temperature of the rails 12, the ballast conditions, the geographical location at the section of the rails 12, as well as the time, the ambient temperatures, the altitude, the engine speed, and the throttle position at the location of the section of the rails 12. The stored data may also include the dynamic braking data and the historical buckling data. The stored data associated with the section of the rails 12 at risk for buckling may be accessible by railroad personnel at the display interface 40 of the remote unit 42 via the internet cloud 50. Specifically, the railroad personnel may download the data from the cloud 50, and review the data at the display interface 40. The data stored in the memory 48 of the event recorder 30 may also be available for download and review at a personal computer or other device using playback analysis software. The playback analysis software may allow railroad personnel or investigators to review and analyze the data in situations where there is no cellular or wireless network, or following a train derailment incident.

Figure 7:
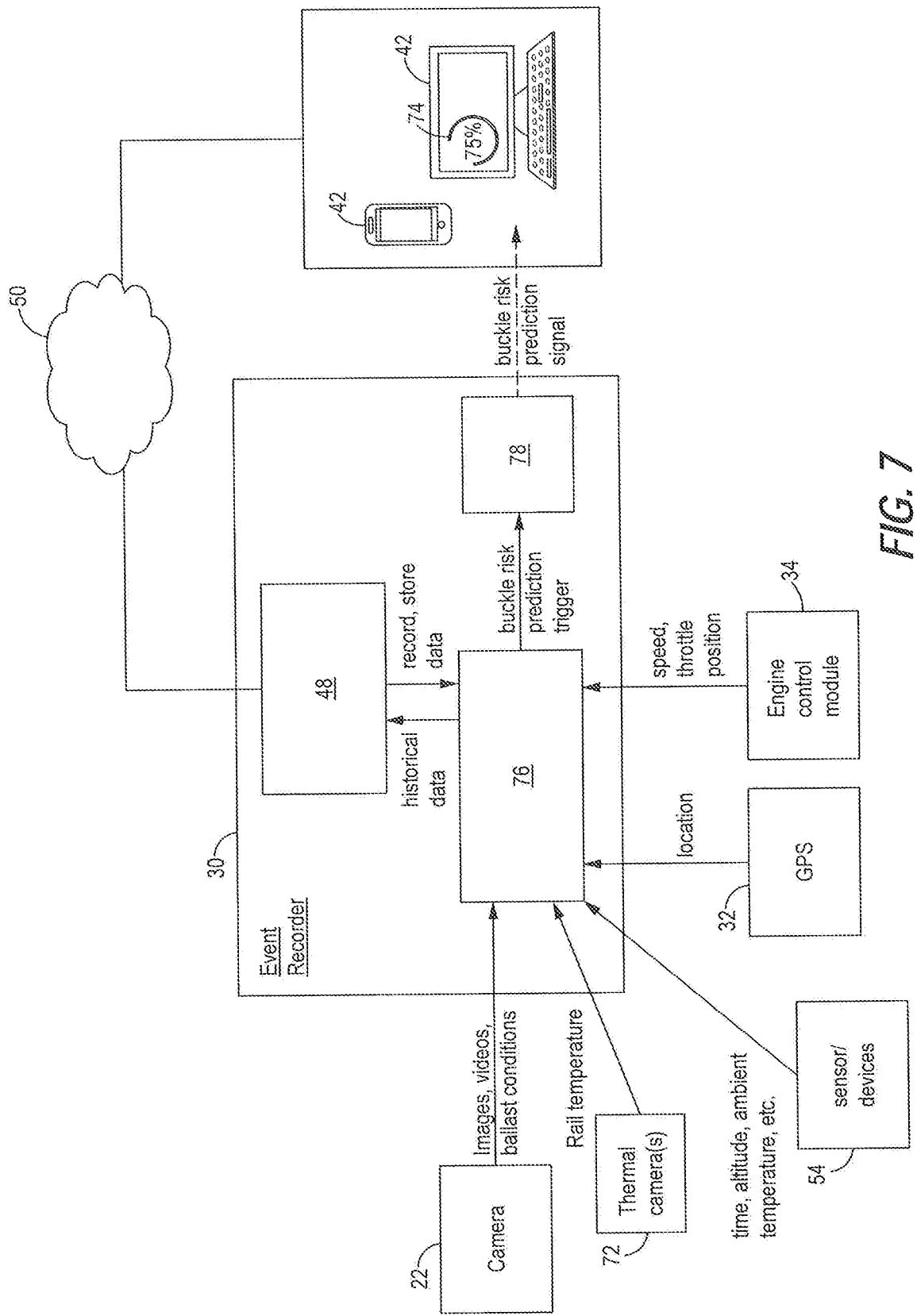
FIG. 7 is a schematic illustration of an exemplary strategy for predicting the risk of rail buckling with the system of FIG. 6, in accordance with the present disclosure.

Turning now to FIG. 7, an exemplary strategy for predicting the risk of rail buckling using the system 70 is shown. The camera 22 may continuously transmit images and videos of the ballast 16 to a prediction module 76 of the event recorder 30. The camera 22 may also continuously assess the conditions of the ballast 16 and transmit the ballast conditions to the prediction module 76. In addition, the thermal camera 72 may continuously transmit the rail temperatures to the prediction module 76.

Based at least on the temperature of the rails 12 and the ballast conditions, the prediction module 76 may calculate the predicted risk for tail buckling at any sections of the rails 12 having both temperatures above a predetermined threshold and poor ballast conditions. The prediction module 76 may collect additional data pertaining to the section of the rails 12 at risk for rail buckling including the location of the section of the rails 12 from the GPS 32, and the engine or train speed, the throttle position, and the dynamic braking data from the ECM 34. The additional data collected by the prediction module 76 may also include the time, altitude, and ambient temperature at the section of rails 12 as obtained from the various sensors and devices 54, as well as the historical buckling data from the memory 48. The prediction module 76 may take the dynamic braking data and the historical buckling data into account when determining the predicted risk for rail buckling. The prediction module 76 may further store the collected data in the memory 48. The stored data may include, but is not limited to, the temperature of the rails 12, the ballast conditions, the geographical location of the section of the rails 12, the engine or train speed and the throttle position at the section of the rails 12 when the data was collected, the dynamic braking data, the historical buckling data, as well as the time, altitude, and ambient temperatures at the section of the rails 12 when the data was collected.

If the predicted risk for rail buckling is above a predetermined threshold, the prediction module 76 may transmit a trigger to a signaling module 78. In response to receipt of the trigger, the signaling module 78 may transmit a signal indicating the predicted risk 74 for rail buckling to the remote unit 42. Railroad personnel at the remote unit 42 may also download and review the data associated with the section of the rails 12 at risk for buckling via the internet cloud 50.

Figure 8:
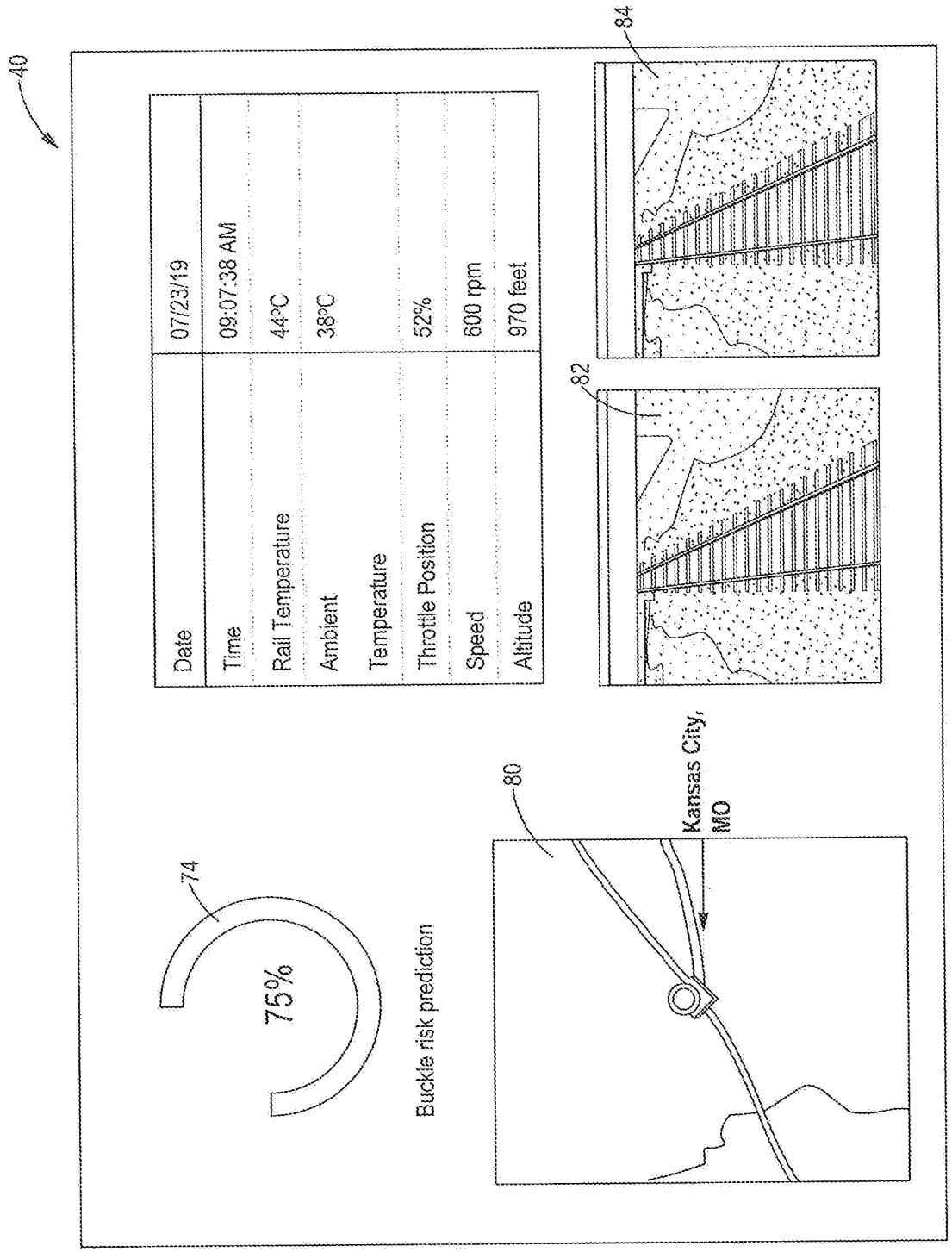
FIG. 8 is an exemplary display interface providing a predicted risk for rail buckling at a section of the rails and other data associated with the section of the rails, in accordance with, the present disclosure.

An exemplary display interface 40 providing the predicted risk for rail buckling as well as other data is shown in FIG. 8. The display interface 40 may be viewed at the remote unit 42 after downloading the data from the internet cloud 50, or at a personal computer or other device after downloading the data directly from the event recorder 30 using the playback analysis software. The display interface 40 may include the predicted risk 74 for rail buckling at a section of the rails 12, a map 80 showing the location of the section of the rails 12 at risk for buckling, one or more images 82 of the section of the rails 12 at risk for buckling, one or more videos 84 of the section of the rails 12 at risk for bucking, the time and date when the prediction was made, the rail temperature(s) at the section of the rails 12, the ambient temperature and altitude at the section of the rails 12, as well as the engine speed and throttle position of the train at the section of the rails 12. It will be understood that the display interface 40 of FIG. 8 is merely exemplary and may include or more or less data in practice. In addition, the data may be viewable in multiple display interfaces.

INDUSTRIAL APPLICABILITY

In general, the teachings of the present disclosure may find applicability in railroad industries. More specifically, the teachings of the present disclosure may be applicable to railroad industries in which the railroad tracks may be at risk for buckling. The teachings of this patent apply to any type of rail transportation. Rail transportation is generally Passenger (Transit) and Freight.

Figure 9:
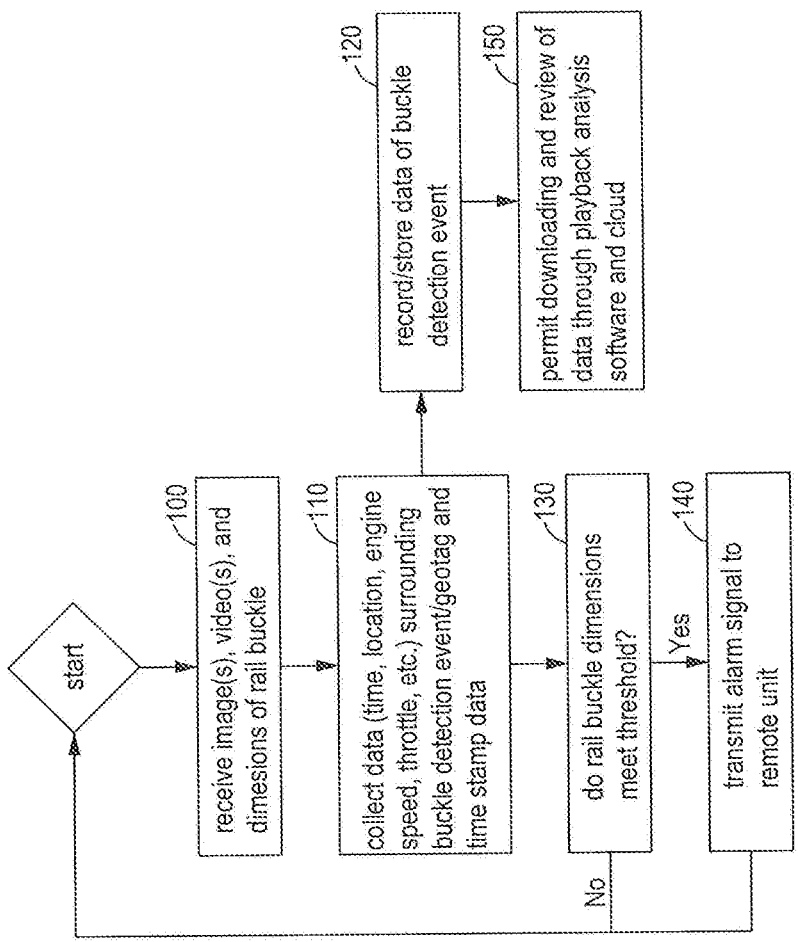
FIG. 9 is a flowchart illustrating a series of steps that may be involved in detecting and alarming a rail buckling event, in accordance with a method of the present disclosure.

FIG. 9 is a method that may be involved in detecting and alarming a rail buckling event as performed by the event recorder 30. Beginning at a first block 100, the event recorder 30 may receive one or more images of the buckled rail 18, one or more videos of the buckled rail 18, and the dimensions of the buckled rail 18 from the forward-facing camera 22 when the camera 22 detects the buckled rail 18. At a next block 110, the event recorder 30 may collect additional data associated with the buckled rail 18 including, but not limited to, the location of the buckled rail 18 (as obtained from the GPS 32), the engine speed and throttle position of the train 26 at the location of the buckled rail 18 (as obtained from the ECM 34), as well as the time of detection, and the altitude and ambient temperature at the location of the buckled rail 18 (as obtained from the various sensors or devices 54). The data received from the camera 22 may be geotagged with the latitude and longitudinal coordinates and timestamped by the event recorder 30 at the block 110. In addition, all of the data collected by the event recorder 30 associated with the buckled rail 18 may be recorded and stored in the memory 48 of the event recorder 30 at a block 120.

At a block 130, the event recorder 30 may determine whether the dimensions of the buckled rail 18 meet the predetermine threshold. If so, the event recorder 30 may transmit the alarm signal 38 to the remote unit 42 to notify railroad personnel of the rail buckling event in real time (block 140). In addition, the data associated with the buckled rail 18 stored in the event recorder 30 may be downloaded and reviewed by the railroad personnel via the internet cloud 50 (block 150). The data may also be downloaded and reviewed by railroad personnel or investigators directly from the event recorder 30 using the playback analysis software.

If the dimensions of the buckled rail are below the predetermine threshold, then the blocks 100 and 110 are repeated until buckled rail having large enough dimensions is detected.

Figure 10:
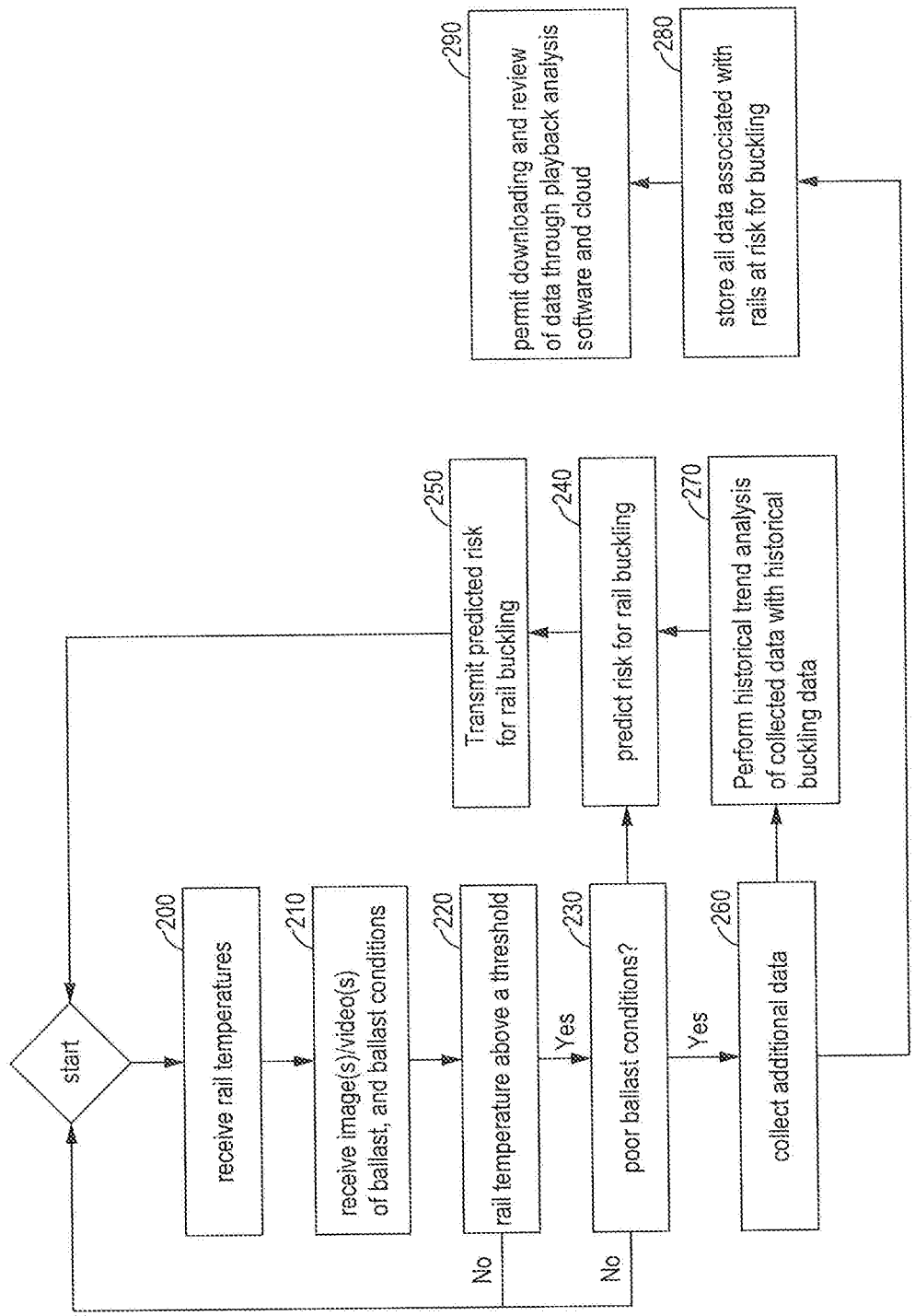
FIG. 10 is a flowchart illustrating a series of steps that may be involved in predicting the risk for rail buckling, in accordance with a method of the present disclosure.

Referring to FIG. 10, a method that may be involved in predicting the risk for rail buckling as performed by the event recorder 30 is shown. The method of FIG. 10 may be performed simultaneously with the method of FIG. 9. According to blocks 200 and 210, the event recorder 30 may receive the rail temperatures from the thermal camera 72, as well as the images and videos of the ballast, and the ballast conditions from the forward-facing camera 22. The event recorder 30 may then assess the risk for buckling at different sections of the rails 12 according to blocks 220 and 230. Specifically, the event recorder 30 may determine that a section of the rails 12 is at risk for rail buckling if: 1) the rail temperature at the section of the rails 12 is above a predetermined threshold, such as the NRT, and 2) the ballast conditions at the section of the rails 12 is poor. If both criteria are not met, the blocks 200, 210, 220, and 230 are repeated at a next section of the rails 12.

If both criteria are met, the event recorder 30 may determine the predicted risk for rail buckling at the section of the rails 12 (block 240), and transmit the predicted risk for rail buckling to the remote unit 42 (block 250). Additionally, the event recorder 30 may collect additional data associated with the section of the rails 12 at risk for buckling (block 260). As discussed in detail above, the additional data may include the geographical location of the section of the rails 12 (as obtained from the GPS 32), the engine or train speed and throttle position of the train at the section of the rails 12 (as obtained from the ECM 34), as well as the time of the data collection, and the altitude and ambient temperatures of the section of the rails 12 at the time of the data collection (as obtained front the various sensors and devices 54). The event recorder 30 may also geotag and timestamp the data associated with the section of the rails 12 at risk for buckling according to the block 260. Furthermore, the additional data may include dynamic braking data and historical buckling data associated with the rails 12 at risk for buckling.

The event recorder 30 may take the dynamic braking data and the historical buckling data into account when assessing the risk for rail buckling. For example, the event recorder 30 may compare the data associated with the section of the rails 12 with the historical buckling data and dynamic braking data using historical trend analysis (block 270), and provide the predicted risk for rail buckling according to the analysis (block 240). The predicted risk for rail buckling may be transmitted to the remote unit 42 in real time according to the block 250, and the method may repeat. Furthermore, all of the data associated with the section of the rails 12 at risk for buckling may be stored in the memory of the recorder 30 according to a block 280, allowing subsequent downloading and review of the data via the playback analysis software or the internee cloud 50 (block 290). It is noted here that the order of the blocks of the methods of FIGS. 9-10 is merely exemplary and may vary in practice.

The systems and methods disclosed herein provide real time signaling of rail buckling events and predicted risks for rail buckling, allowing railroad personnel to timely respond and prevent train accidents. In addition, railroad personnel may have access to various data pertaining to the buckled rails or the rails at risk for buckling in the event recorder, allowing railroad personnel to take such data into consideration when determining how to respond. The data may also be extracted from the event recorder and reviewed by railroad personnel or investigators in situations where the train is traveling through regions having poor cellular or wireless connections, or following a train accident.

What is claimed is:

1. A system for detecting a buckled rail in a railroad track, comprising:
   a forward-facing camera mounted on a locomotive of a train traveling on the railroad track, the forward-facing camera being configured to capture images of rails of the railroad track ahead of the locomotive, to detect the buckled rail in the images, and to measure dimensions of the buckled rail;
   a sensor mounted on the train and configured to detect an ambient temperature; and
   an event recorder onboard the locomotive and in communication with the forward-facing camera and the sensor, the event recorder being configured to:
     receive data from the forward-facing camera associated with the buckled rail when the forward-facing camera detects the buckled rail, the data including one or more images of the buckled rail and the dimensions of the buckled rail;
     transmit an alarm signal to a display interface of a remote unit when the dimensions of the buckled rail meet a predetermined threshold;
     collect a time that the buckled rail is detected; and
     collect from the sensor, when the forward-facing camera detects the buckled rail, data indicative of the ambient temperature surrounding the buckled rail.

2. The system of claim 1, wherein the forward-facing camera is located behind a windshield of the locomotive.

3. The system of claim 1, wherein the event recorder is further configured to collect additional data associated with the buckled rail including a geographical location of the buckled rail, and a speed of the train at the location of the buckled rail.

4. The system of claim 3, wherein the event recorder is in communication with a global positioning system (GPS) on the locomotive, and wherein the event recorder is configured to determine the geographical location of the buckled rail based on signals received from the GPS.

5. The system of claim 3, wherein the event recorder is in communication with an engine control module (ECM) of the locomotive, and wherein the event recorder is configured to determine the speed of the train at the location of the buckled rail based on signals received from the ECM.

6. The system of claim 3, wherein the event recorder is further configured to store all of the data associated with the buckled rail in a memory of the event recorder.

7. The system of claim 6, further comprising playback analysis software that allows a user to download and review the data associated with the buckled rail stored in the memory of the event recorder.

8. The system of claim 6, wherein the data associated with the buckled rail and stored in the memory of the event recorder is available for download and review at the display interface of the remote unit via an internet cloud.

9. The system of claim 3, wherein the event recorder transmits the alarm signal to the remote unit over a cellular or wireless network.

10. The system of claim 9, wherein the remote unit is a cell phone, a tablet, or a personal computer (PC) at a back office of a railroad company.

11. A system for predicting a risk for rail buckling in a railroad track, the railroad track including rails connected by ties and supported on ballast, comprising:
   a forward-facing camera mounted on a locomotive of a train traveling on the railroad track, the forward-facing camera being configured to capture images of the railroad track ahead of the locomotive, and to assess the condition of the ballast;

a thermal camera mounted to the locomotive and configured to measure a temperature of the rails, wherein a frame rate of the thermal camera is adjusted according to an engine speed of the locomotive so that the thermal camera measures the temperature of the rails at predetermined increments regardless of the engine speed; and an event recorder onboard the locomotive and in communication with the forward-facing camera and the thermal camera, the event recorder being configured to receive data from the forward-facing camera, an ambient temperature sensor, and the thermal camera, the data including the temperature of the rails from the thermal camera, an ambient temperature surrounding the locomotive from the ambient temperature sensor, and the images and the condition of the ballast from the forward-facing camera, the event recorder being further configured to predict a risk for rail buckling at a section of the rails at least based on the temperature of the rails and the condition of the ballast at the section of the rails, the event recorder is further configured to predict a risk for a rail buckling at the section of the rails by comparing the ambient temperature surrounding the locomotive to historical buckling data including seasonal ambient temperatures.

12. The system of claim 11, wherein the event recorder is further configured to transmit the predicted risk for rail buckling to a display interface of a remote unit associated with a railroad company.

13. The system of claim 12, wherein the event recorder is further configured to determine that the rails are at risk for rail buckling when the temperature of the rails is above a predetermined threshold, and when the condition of the ballast is poor.

14. The system of claim 13, wherein the event recorder is further configured to collect additional data associated with the section of rails at risk for rail buckling, the additional data at least including a geographical location of the section of rails at risk for rail buckling.

15. The system of claim 14, wherein the additional data further includes dynamic braking data indicating whether dynamic braking at the section or rails has occurred, wherein the dynamic braking data is compared to historic buckling data to predict the risk for rail buckling at the section of the rails.

16. The system of claim 14, wherein the event recorder is further configured to predict the risk for rail buckling at the section of rails by performing trend analysis of the data with historical buckling data stored in a memory of the event recorder.

17. The system of claim 14, wherein the event recorder is further configured to store all of the data associated with the section of rails at risk for buckling, the stored data being accessible from the remote unit via an internet cloud.

18. The system of claim 17, wherein the event recorder is configured to transmit the predicted risk for rail buckling to the remote unit over a cellular or wireless network.

19. A method for detecting buckled rail and for predicting a risk for rail buckling in a railroad track, the railroad track including rails connected by ties and supported on ballast, comprising:

receiving data from a forward-facing camera mounted on a locomotive traveling on the railroad track, the data including one or more images of the buckled rail and dimensions of the buckled rail when the forward-facing camera detects the buckled rail, the data further including one or more images of the ballast, and condition of the ballast;

receiving data from a thermal camera mounted to the locomotive, the data including temperatures of the rails, wherein a frame rate of the thermal camera is adjusted according to an engine speed of the locomotive so that the thermal camera measures the temperature of the rails at predetermined increments regardless of the engine speed;

transmitting an alarm signal to a display interface of a remote unit if the dimensions of the buckled rail meet a predetermined threshold;

predicting a risk for rail buckling at a section of the rails based at least on the temperatures of the rails and the condition of the ballast at the section of the rails; and transmitting the predicted risk for rail buckling at the section of the rails to the display interface of the remote unit if the predicted risk is above a predetermined threshold, wherein data associated with the section of rails at risk for rail buckling including dynamic braking data indicating whether dynamic braking at the section or rails has occurred is also received, and the dynamic braking data is compared to historic buckling data during the predicting a risk for rail buckling.

20. The method of claim 19, wherein the method further comprises storing all of the data in a memory, the data being available for download and viewing at the display interface of the remote unit via an internet cloud.

* * * * *